United States Patent
Malde et al.

(10) Patent No.: US 10,949,333 B1
(45) Date of Patent: Mar. 16, 2021

(54) APPLICATION MATURITY CONSOLE

(71) Applicant: Visa International Service Association, San Francisco, CA (US)

(72) Inventors: Ila Malde, Foster City, CA (US); Ze Hong Sean Tay, Singapore (SG); Karthik Venkatarman, Singapore (SG); Vara Prasad Beerakam, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/597,670

(22) Filed: Oct. 9, 2019

(51) Int. Cl.
G06F 9/44 (2018.01)
G06F 11/36 (2006.01)
G06F 8/70 (2018.01)

(52) U.S. Cl.
CPC ............ *G06F 11/3676* (2013.01); *G06F 8/70* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 2014/0282355 A1* | 9/2014 | Berry | G06F 8/70 717/101 |
| 2014/0317598 A1* | 10/2014 | Luke | G06F 8/70 717/120 |
| 2015/0370774 A1* | 12/2015 | Mason | G06F 16/23 715/224 |
| 2016/0321065 A1* | 11/2016 | Capuozzo | G06F 11/3668 |

* cited by examiner

*Primary Examiner* — Anna C Deng
(74) *Attorney, Agent, or Firm* — Loeb & Loeb LLP

(57) ABSTRACT

An automated method for monitoring a lifecycle of code development includes first receiving a submission from a developer for tracking a maturity of an application program as it goes through a software development life cycle pipeline and for deployment into a production environment. A database is constructed with data fields associated with the application program. The code coverage of the application program is determined, as well as a test coverage value. A plurality of reliability parameters are assigned, along with a plurality of security parameters associated with the application program. A maturity score is calculated as a function of the plurality of the reliability parameters, the plurality of security parameters, the development status, the code coverage value, and the test coverage value. A graphical user interface (GUI) is provided to a user for analysis and modification.

19 Claims, 20 Drawing Sheets

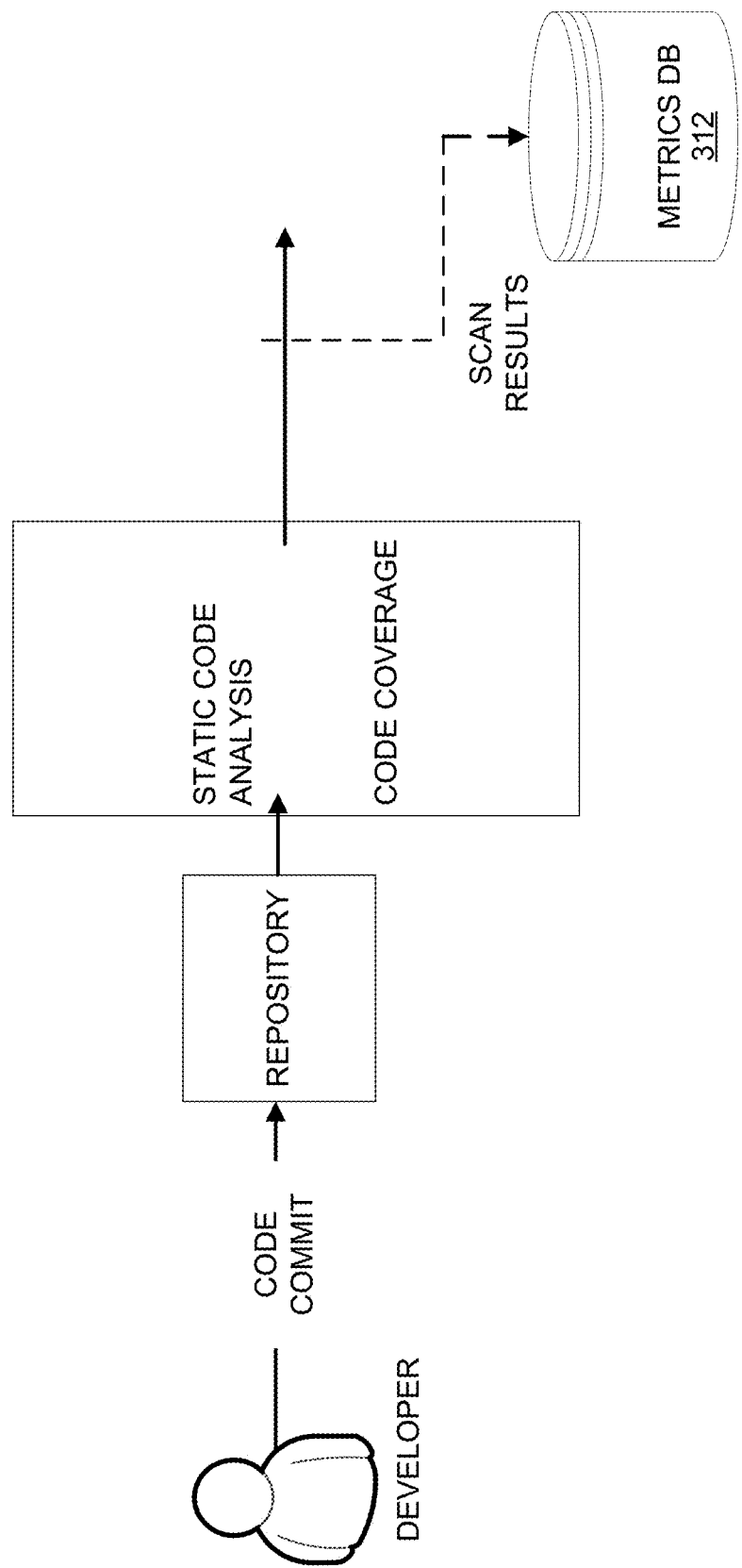

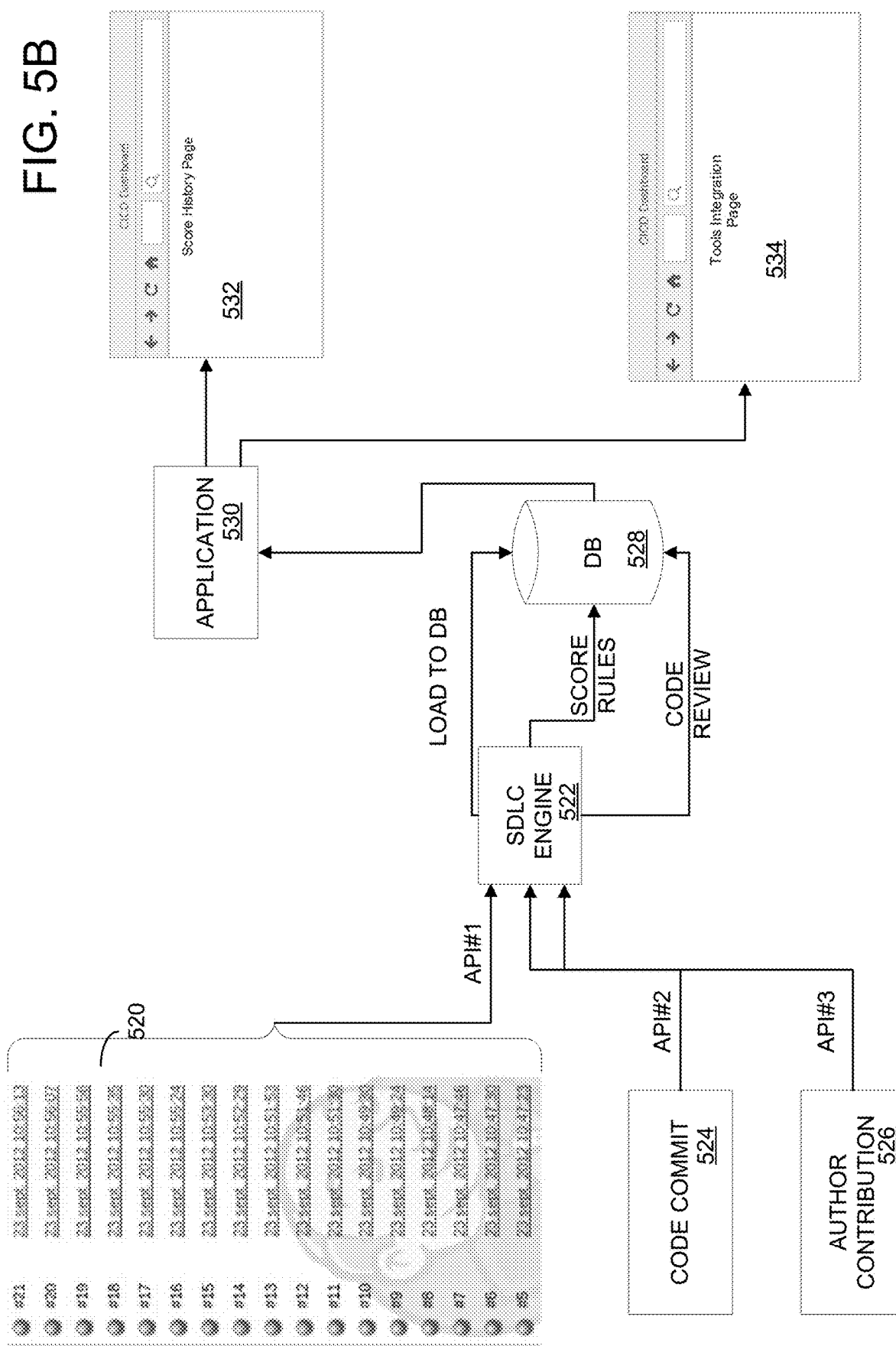

APPLICATION MATURITY CONSOLE

TECHNICAL FIELD

Embodiments discussed herein generally relate to identifying application or program lifecycle and maturity.

BACKGROUND

Developers and programmers write or design software or application programs on small and big projects with varying complexity. Some pieces of code are meant to update existing application programs while others may be part of an application programming interface (API).

In some current practices, developers' codes or program submissions are entered or saved in a central repository for later retrieval or evaluation. For example, in a very high level, the codes started from design or conception stages before the actual coding, troubleshooting, and compiling. Once it's compiled, the codes may go through other (e.g., alpha, beta, etc.) testing before they are placed in production. In such example, diagram 100 in FIG. 1, respectively, illustrate some of the current approaches to software development pipeline or flow.

However, this lifecycle of developed codes typically ends when the program is in deployed in production, and could possibly restart if defects are found in production, or business requiring further enhancements. In addition, various points of completion or milestones in the development do not yield information about the code itself, such as intrinsic values (e.g., how much time a developer has spent on developments or how many times the developer has checked in codes or running debugging, etc.) and extrinsic values (e.g., return of investment (ROI) value of the code, etc.) are lost in the process. Unfortunately, current system fails to provide a convenient or transparent view on the codes so that security analysis and other stress tests may be performed before and after deployment.

Therefore, embodiments attempt to create a technical solution to address the deficiencies of the challenges above.

SUMMARY

Embodiments create a technical solution to the above challenges by building a comprehensive code maturity portal for submission, testing and analysis of codes, software, and application programs. Aspects of embodiments may further create data structures to provide data points available for monitoring the progress of the code development by displaying the updates, as well as generating a score to the user so that the user may evaluate its performance. Moreover, such monitoring may provide a transparent view for both developers and supervisors/managers to know the progress of the code development and lifecycle.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIGS. 3A to 3E are flow diagrams illustrating scoring determination of a maturity of an application according to one embodiment.

FIGS. 4A-4I are graphical user interfaces (GUIs) of an application maturity management tool according to one embodiment.

FIG. 5B is another flow chart illustrating a method according to one embodiment.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments may create a system for determine, monitor and analyze application maturity. Aspects of embodiments create a data structure that not only is designed to store the content (or a pointer to a data storage location) of the code or application, but also data fields for storing additional related or associated data of the application for application maturity analysis and score.

Figure 1:
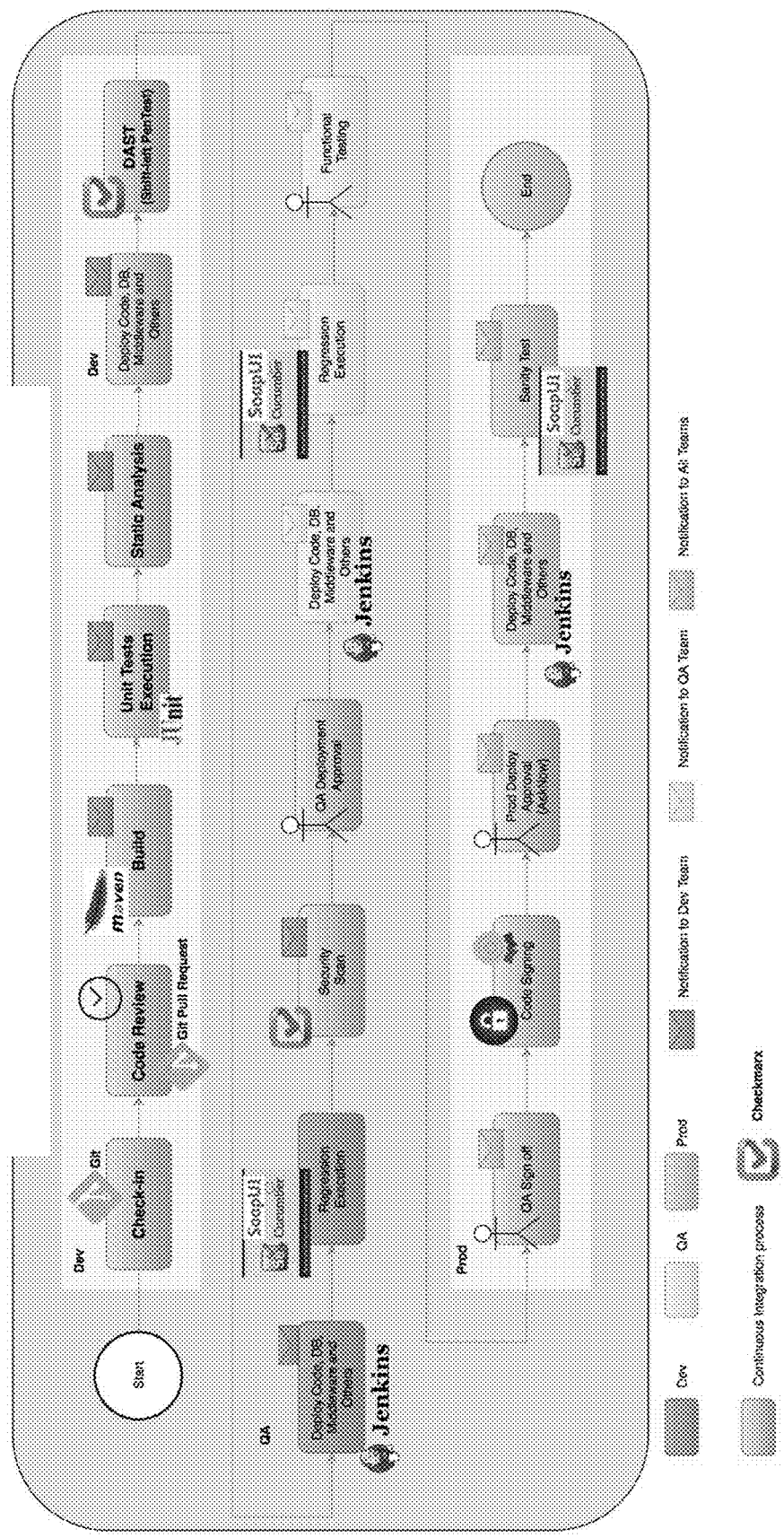
FIG. 1 is a diagram illustrating an exemplary prior art practice of software development.
Figure 2:
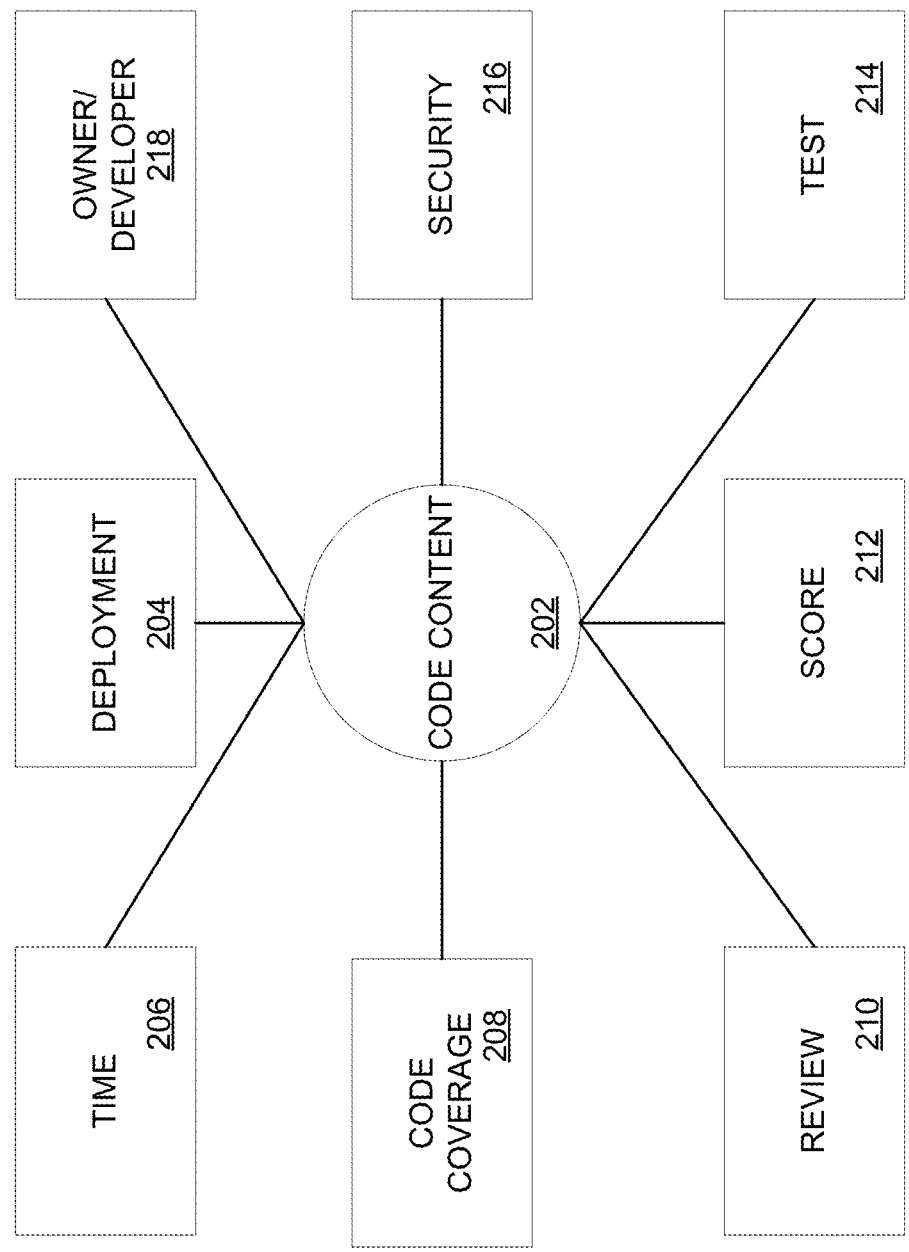
FIG. 2 is a diagram illustrating a data structure for measuring application maturity according to one embodiment.

Referring to FIG. 2, a data structure 200 further illustrates one embodiment. For example, the data structure 200 may include a first field or storage unit 202 for storing content or data related to the code. For example, the first field 202 may store the code in a database. In another embodiment, the first field 202 may store a pointer or reference data to the actual storage location of the code. In another embodiment, the data field 202 may store a name or description of the code. The data structure 200 may further include a second field 204 for storing deployment related data. For example, the second field 204 may include data such as deployment schedule, number of releases, deployment status, a number of deployment, etc.

The data structure 200 may also include a third field 206 for storing time related data, such as time of creation of the code, time of the check-in to the repository, build time, time of updates, time of deployment, time of a previous deployment, test time, release year, etc. The data structure 200 may include a fourth field 208 for storing code coverage data, such as technology involved or used by the code, the application used or involved with the code, business entity involved with the code, projects related to the code, service application used or involved with the code, any branch of the code, etc. The data structure 200 may also include a fifth field 210 for storing review data, which may include return of investment (ROI) parameters, various statistical analysis parameters or settings of author contributions (e.g., checkmarx statistics, Static Code analysis data capture, GIT statistics, etc.), recommendation information for improvements, suggestions, etc. The data structure 200 may include a sixth field 212 for storing score related data, such as a build & deploy score or percentage, a code quality score, a security score, a code coverage score, a test average score, a maturity score, etc.

The data structure 200 may also include a seventh field 214 for storing test related data, such as number of test, test execution time, test type, test number, test results, etc. The data structure 200 may further include an eighth field 216 for storing scan results data. The data structure 200 may further include a ninth field 218 for storing data relating to the name, identification, contact information, etc., of the developer or owner of the code. In another embodiment, the field 218 may store other owner/developer information such as supervisor of the code project, etc. In another embodiment, the owner/developer field 218 may also include names of co-developers, etc.

In one embodiment, some of the information in the data structure 200 may be populated or filled automatically. For example, when a developer is logged into a system to start working on writing code or application programs, the developer may interface with a graphical user interface (GUI) to onboard an application on the embodiment. The developer may create code and check-in to the code repository. As soon as the code is checked-in a software development life cycle (SDLC) pipeline may begin and the data structure 200 may automatically, and continuously, update various fields, such as time, code coverage, review, code content, etc.

Figure 3A:
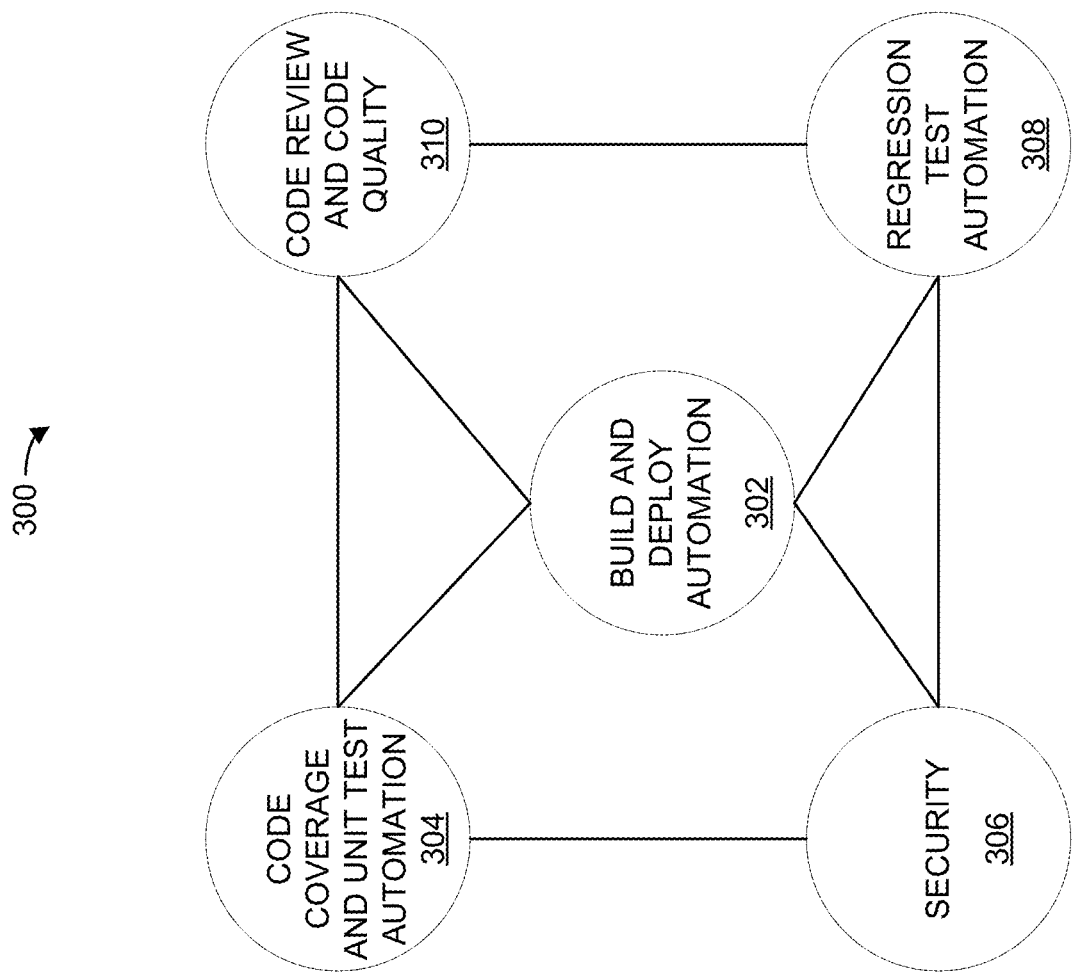

With such data structure 200, aspects of embodiments may expose the data in the fields to further interface and processing. Referring now to FIG. 3A, a diagram 300 illustrates five maturity drivers of an application maturity management system according to one embodiment. For example, the application maturity management system may include components or modules such as a build and deploy automation component 302, a code coverage and unit test automation component 304, a security component 306, a regression test automation component 308, and a code review and code quality component 310. These components utilize the data structure 200 to provide the maturity score of the code or application developed by the developer. In one embodiment, these five components have been identified to improve the release agility, reduce security risks, and improve code quality that may improve and result in defect free products. In one aspect, these components include automated features and may automatically measure the progress of automation for each application based on the data structure 200 built for the code.

Figure 3B:
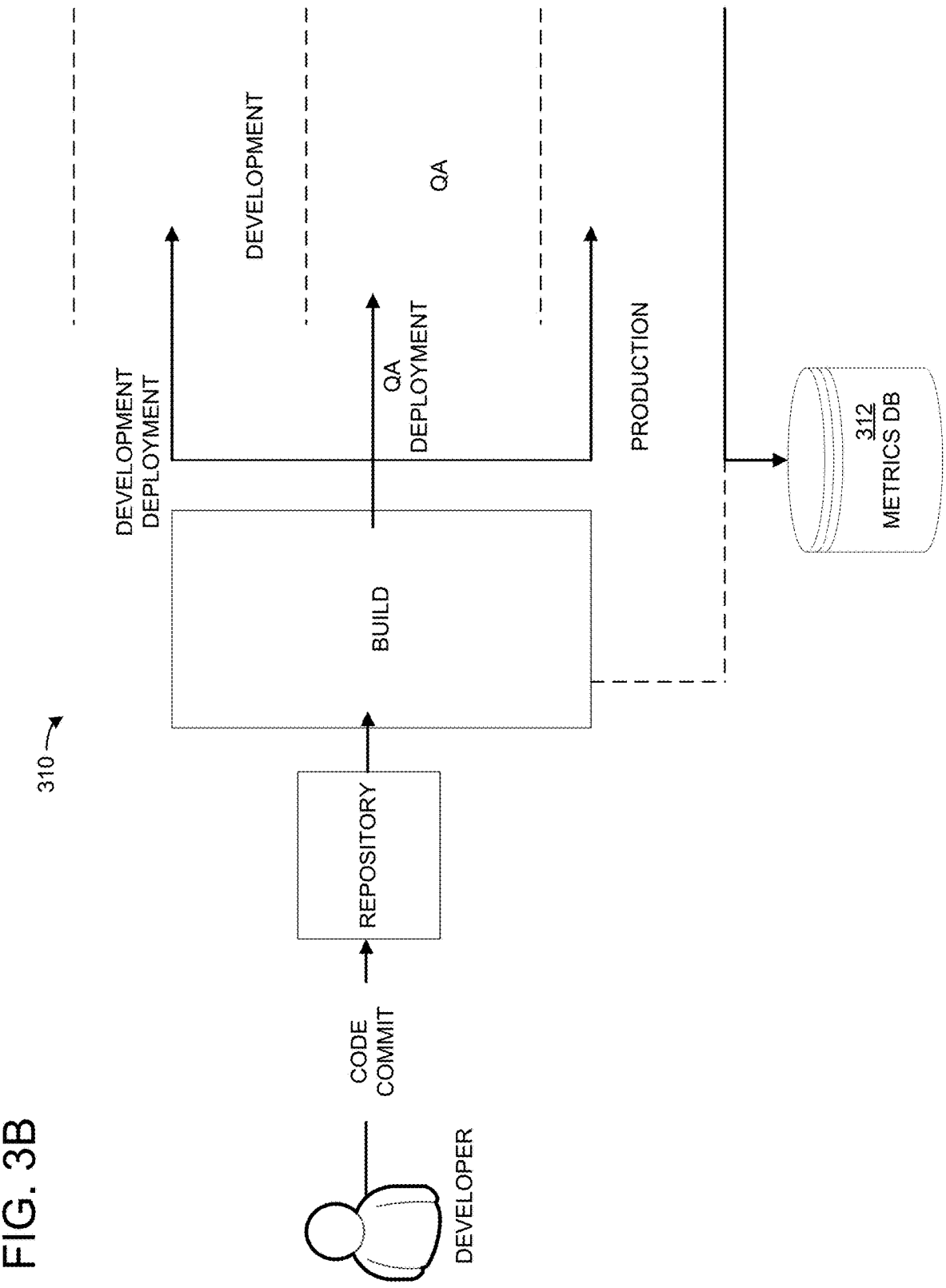

For example, referring to FIG. 3B, a diagram 310 illustrates an exemplary build and deploy automation. In order to consider an application/app-component is matured in the build and deploy automation component 302, build and Dev, QA, Perf, UAT and PROD Deployments are recorded in a metrics database 312.

The component 302 may then verify the metrics database 312 whether there were successful build and deployments for each app or code. Upon successful verification, the code or application may receive a score of "1" from this component 302. In a further embodiment, the component 302 may read the data structure 200's fields, such as the fields 202, 204, 206, 208, etc. as part of the verification.

Figure 3C:
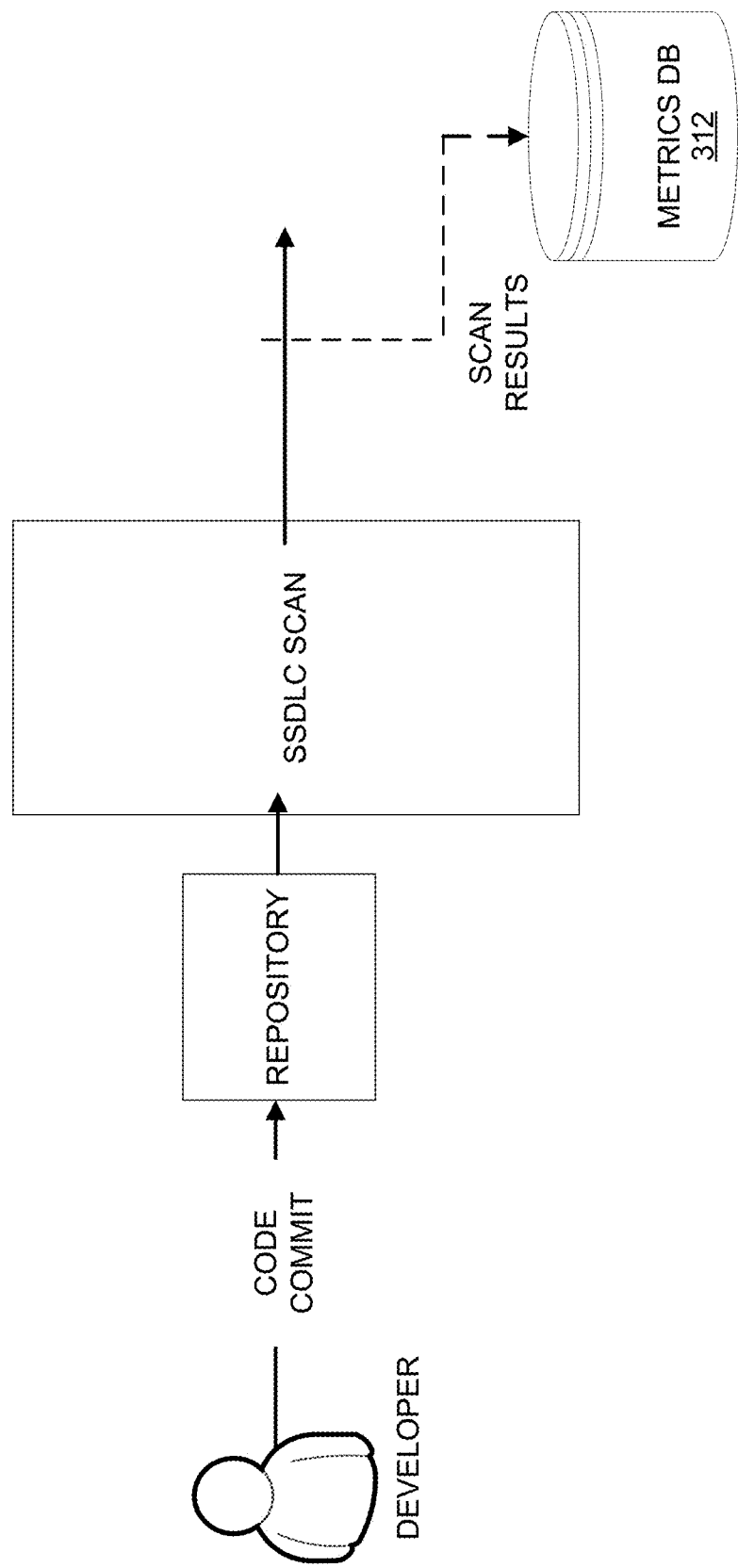
Figure 3E:
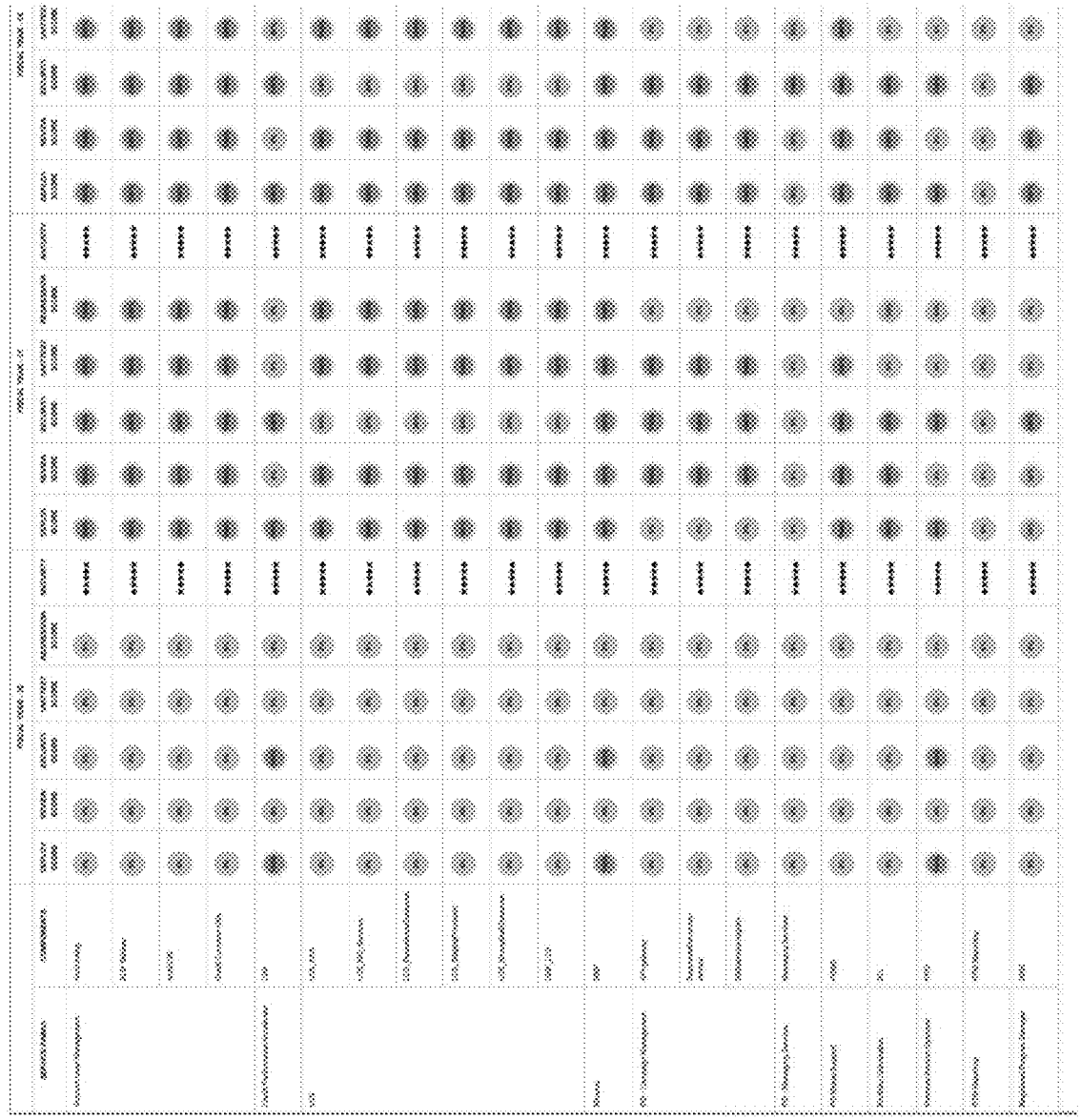

As another illustration, referring now to FIG. 3C, another diagram 320 may illustrate the security component 306. For example, the security component 306 may scan a committed code or other determined time frame and then evaluated for maturity ranking. The displayed security findings may bring awareness to the developer to fix or repaired the findings immediately while still in development phase. In another embodiment, the security component 306 may call or execute other tools, such as Checkmarx, to verify and produce a score of "1" if the scan was performed daily or there are security scans between two most recent production deployments. In another embodiment, if the scan result from the security finding does not find any high or medium vulnerabilities and the low were also below the minimum threshold to score 1. Again, similar to the component 302, the security component 306 may read the data in the fields of the data structure 200 and may write the score to the score field 212.

In a further embodiment, the unit test component 304 may similarly perform operations to determine the maturity of the code as shown in FIG. 3D. For example, the unit test component 304 may conduct a scan to each committed code as shown in a diagram 330. In one embodiment, such scan may involve identifying anti-patterns, coding standard violations, etc., to assist the code reviewers with an automated review results and several others. In another embodiment, the scan may also identify a number of Unit Tests in an app and to measure the Coverage of the Unit Tests. In one example, every code commit results in a scan using a tool such as SonarQube. Scan results are loaded to the metrics database 312 that further helps measure the maturity of the app or the code.

The score from the unit test component 304 may be a function of the code coverage. For example, if coverage is >=70%, app gets a score of "1". If coverage is between 30-70%, gets a score of "0.5," if less than 30%, gets a score of "0." It is to be understood that other ranges may be used without departing from the spirit and scope of the embodiments.

Moreover, the data structure 200 includes fields storing or retrieving data from the code repository during the development stage. As such, a score of "1" may be assigned to the code or the app if a pull request is used to merge the code into a development branch and that there are comments for each pull request.

In a further embodiment, the test automation component 308 may include test scripts such as selenium for user interface (UI) based tests, and SoapUI for API tests. In one example, the test automation component 308 may test functional and regression tests execution on a scheduled basis, such as for each sprint or release.

Similar to the components above, the test automation component 308 may access the data structure 200 to retrieve and store time the test automation component 308 used to take to run the functional/regression test suits for storing in the data structure 200. Upon executing the tests, the time taken is measured and recorded in the data structure 200 as well. Difference between how much time it took to run automation functional/regression tests AND time it would have taken to run the same manually is the time saving, which may be used for the scoring. Such time saving data may further be stored in the data structure 200.

For example, an automated score calculation may include:

A score 0 if % time saved from manual testing is below 30%,

A score 0.5 if % time saved from manual testing is 30-69%

A score 1 if % time saved from manual testing is >=70%.

FIG. 3F illustrates an exemplary final score GUI 340 showing each of the score above. In another embodiment, depending on the availability of the data, the GUI 340 may also illustrate comparisons to different time frame, such as by year (e.g., 2017, 2018, etc.).

Figure 4A:
Figure 4B:
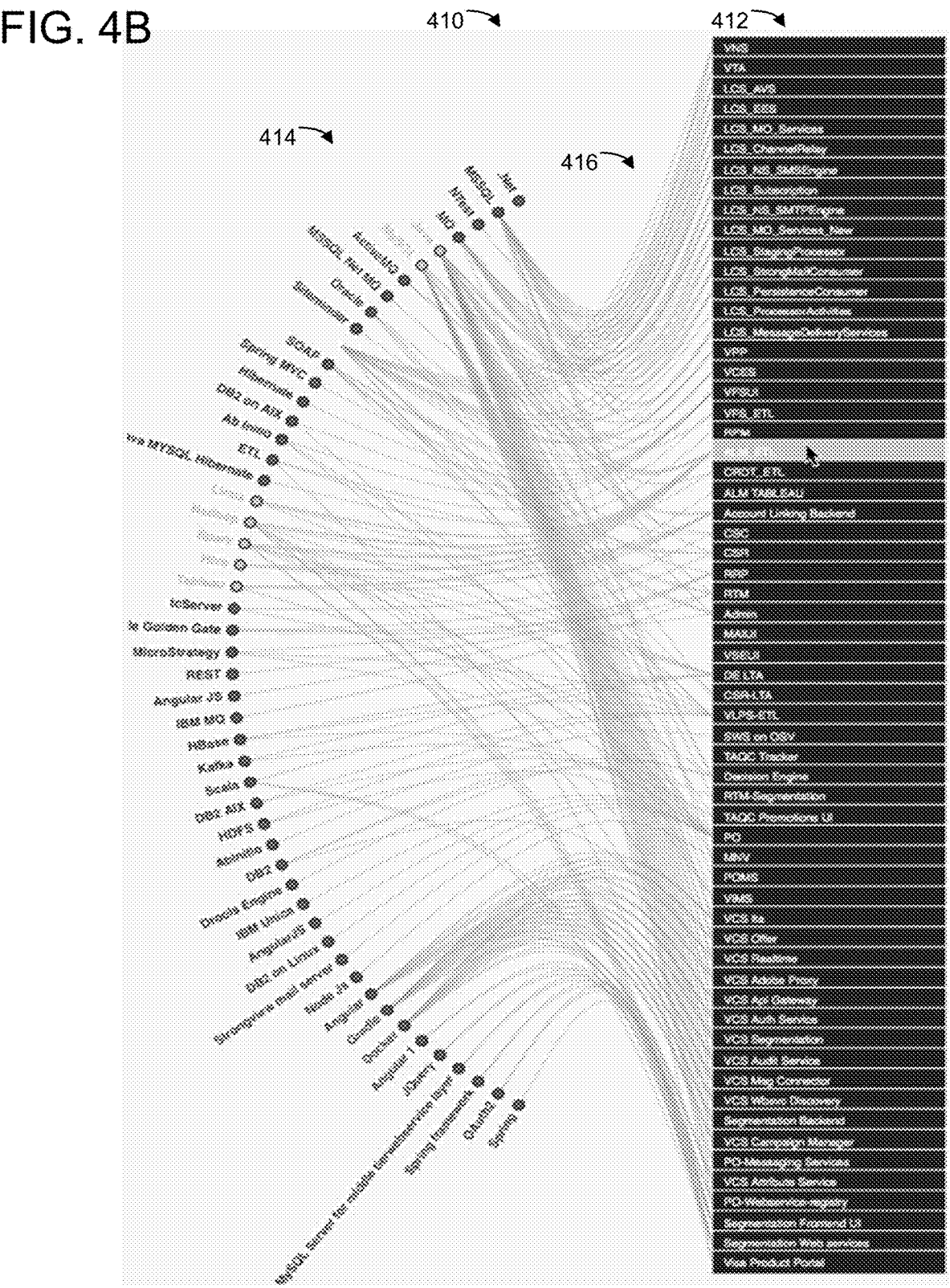
Figure 4C:
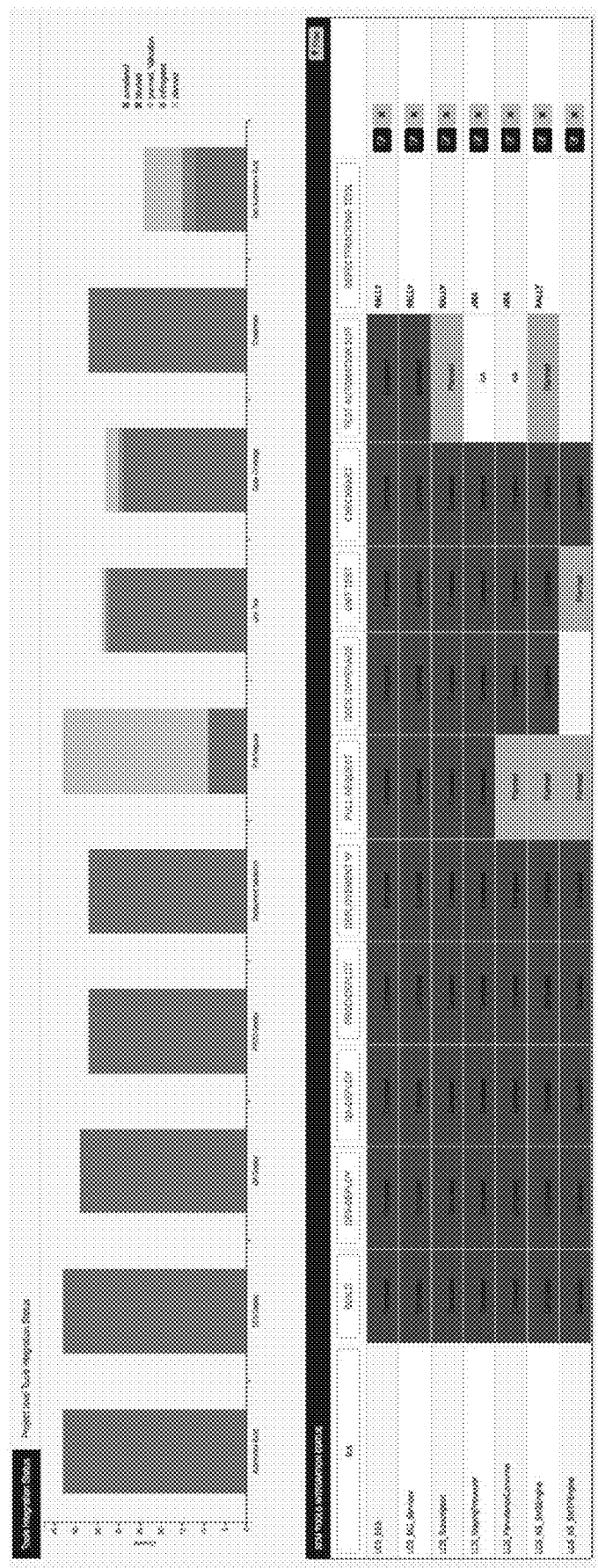
Figure 4D:
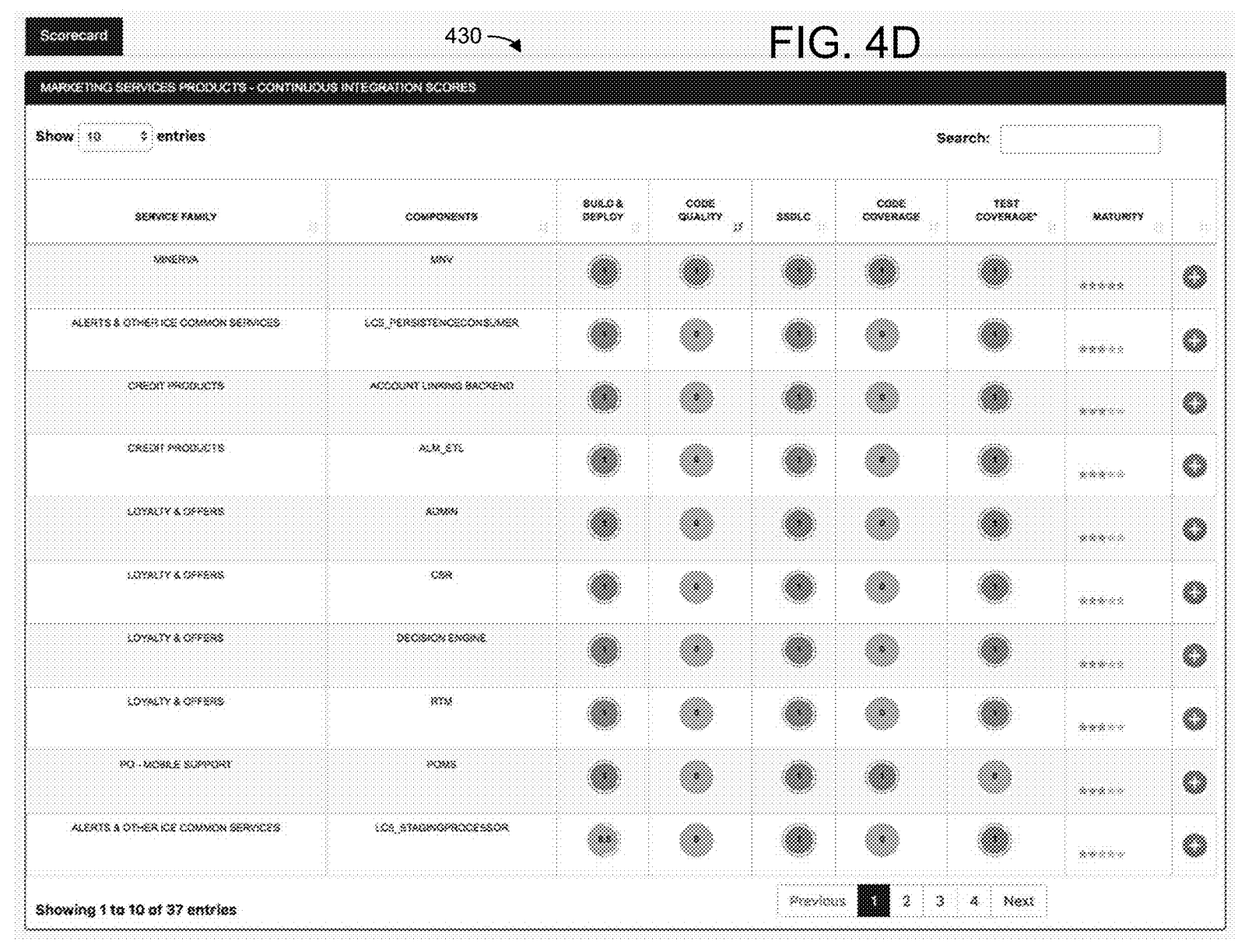
Figure 4E:
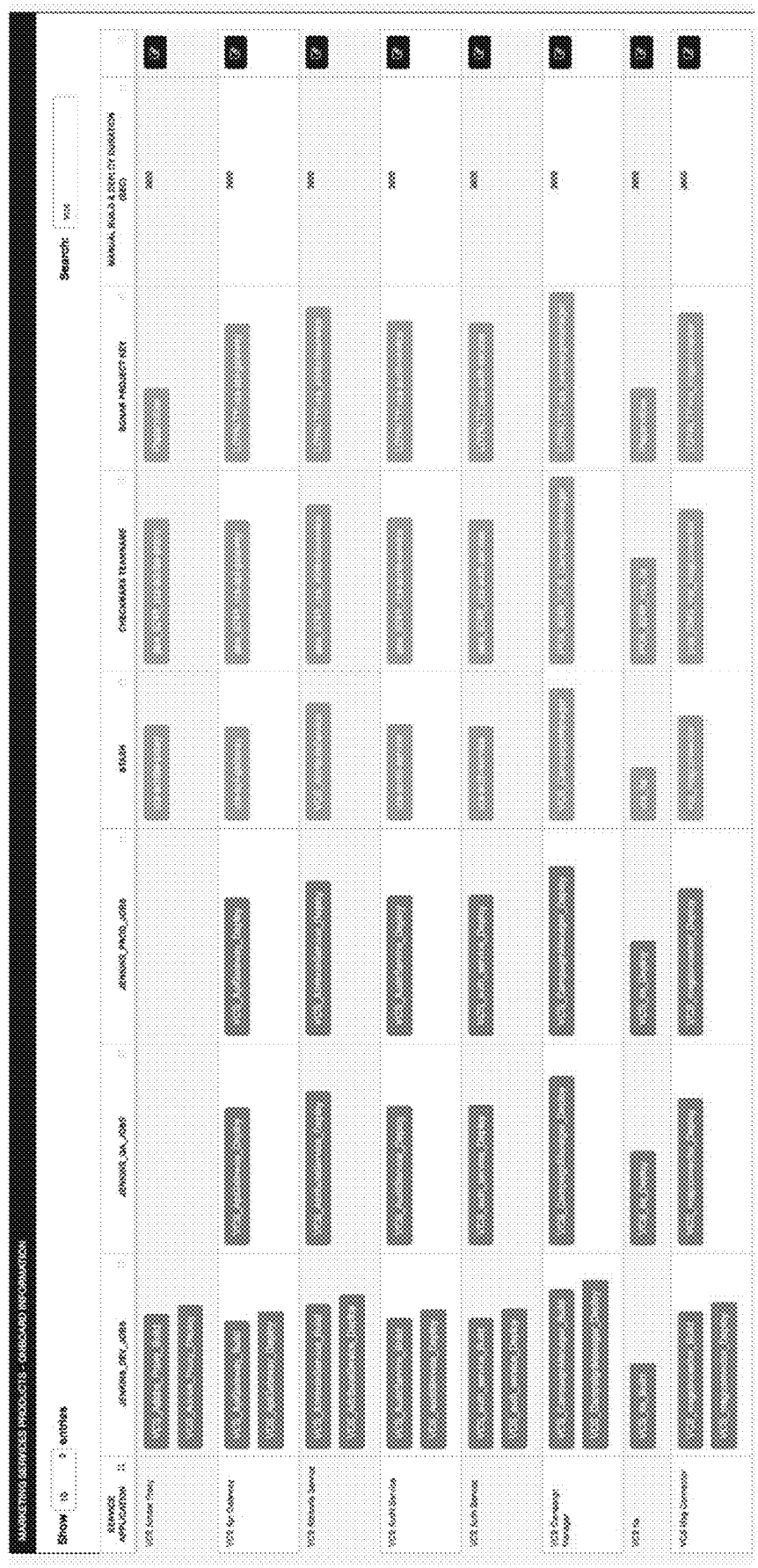
Figure 4F:
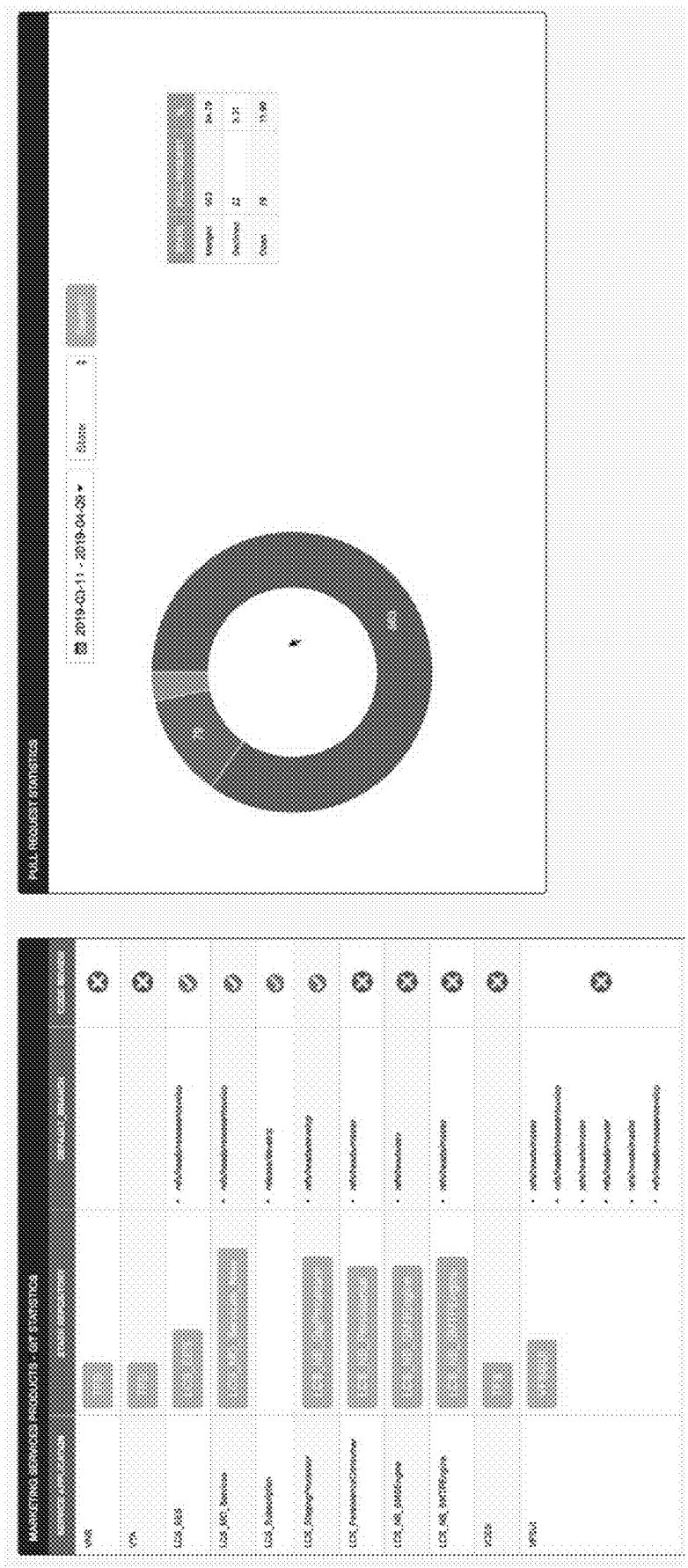
Figure 4G:
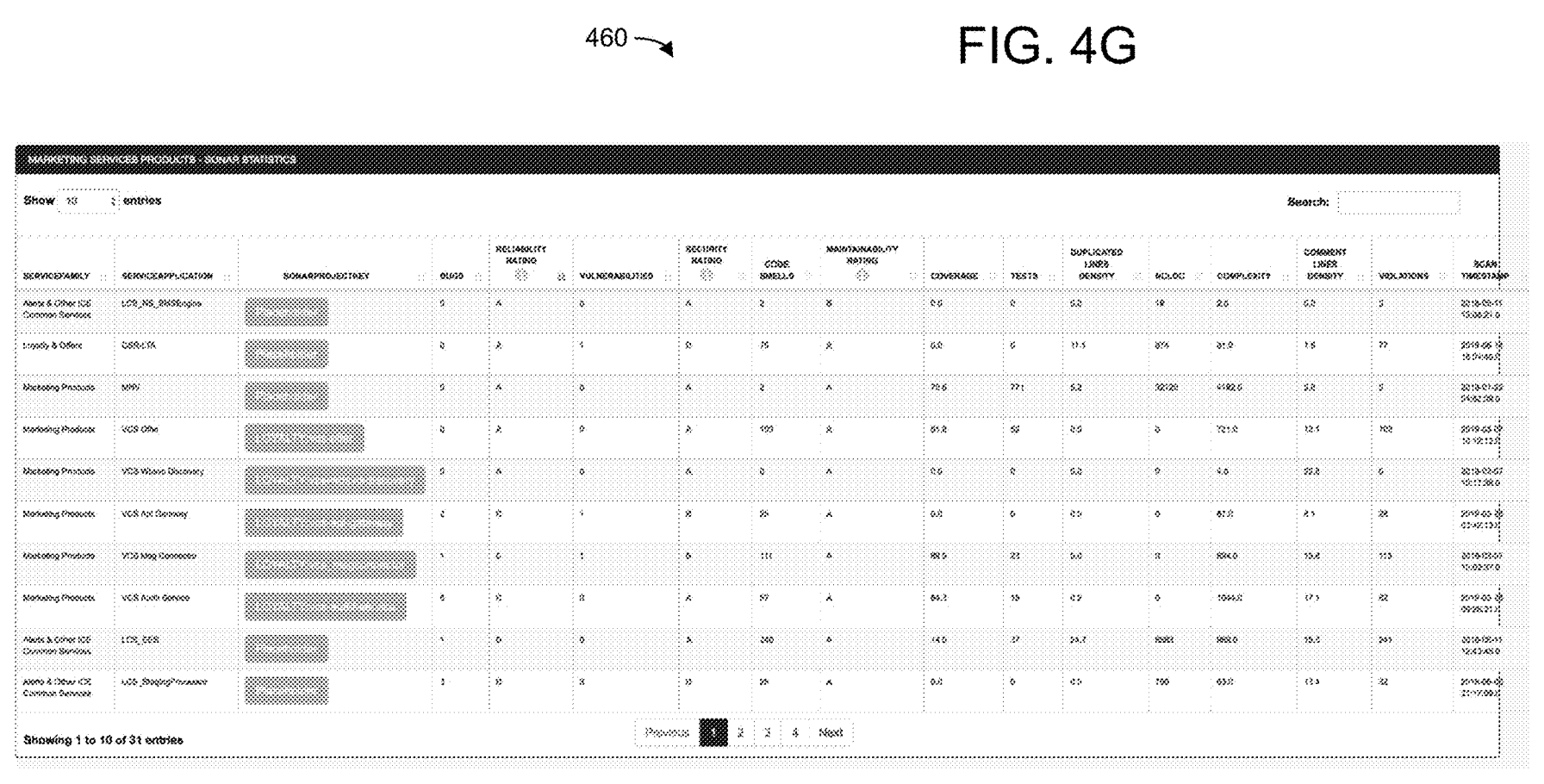
Figure 4H:
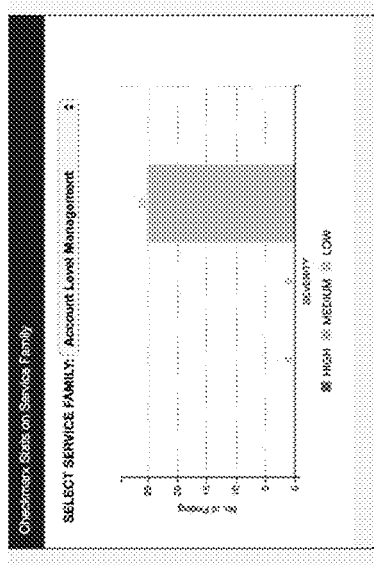
Figure 4I:
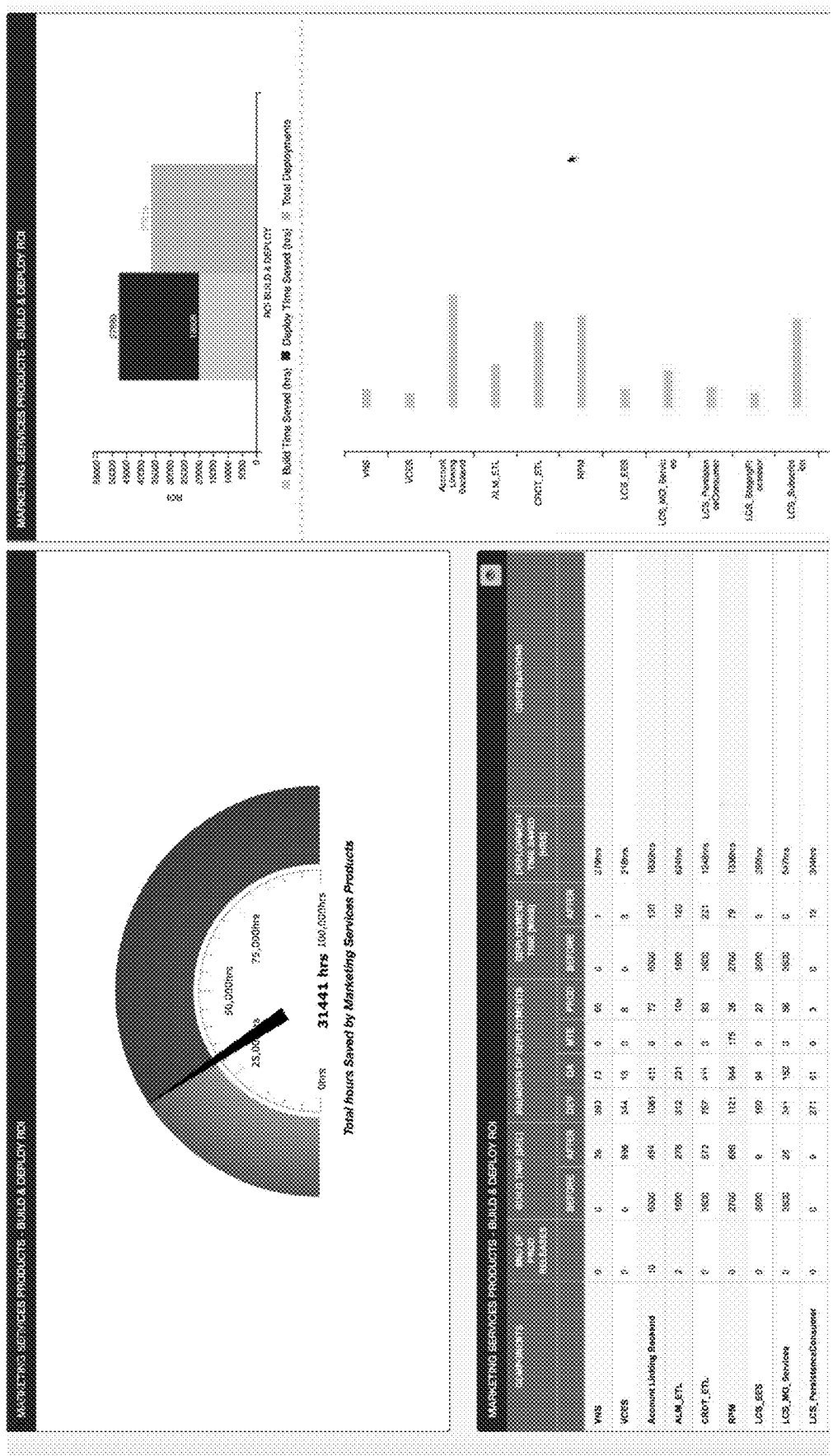

Moreover, FIG. 4A may illustrate another GUI 400 of the various aspects of the application maturity management system. For example, the GUI 400 may illustrate a set of features or options to visualize various aspects of the code or application. FIG. 4B may illustrate an exemplary GUI 410 showing the relationship between the technology involved with the code that is developed or under development. For example, a column 412 may illustrate a list of codes or apps developed and a fanned out list 414 illustrate one or more technologies that have been embodied in the codes in column 412. A link 416, illustrated by lines connecting the column to the list in 414, shows the connection between the two. When a user highlights one of the code, such as ALM_ETL, the link 416 or links are highlighted.

It is to be understood that other GUI representations of the relationships between the codes and the technology may be used without departing from the spirit and scope of the embodiments. Moreover, the data structure 200 includes the field 208 for storing or referencing the technologies associated with the code.

For example, FIGS. 4C through 4I illustrates various GUIs (e.g., 420, 430, 440, 450, 460, 470, and 480) showing various features of the application maturity system.

It is to be understood that while the fields in the data structure 200 may store data with respect to each data fields, other metadata may be associated or stored in the data structure 200 or reference the data structure 200 without departing from the spirit and scope of the embodiments.

Figure 5A:
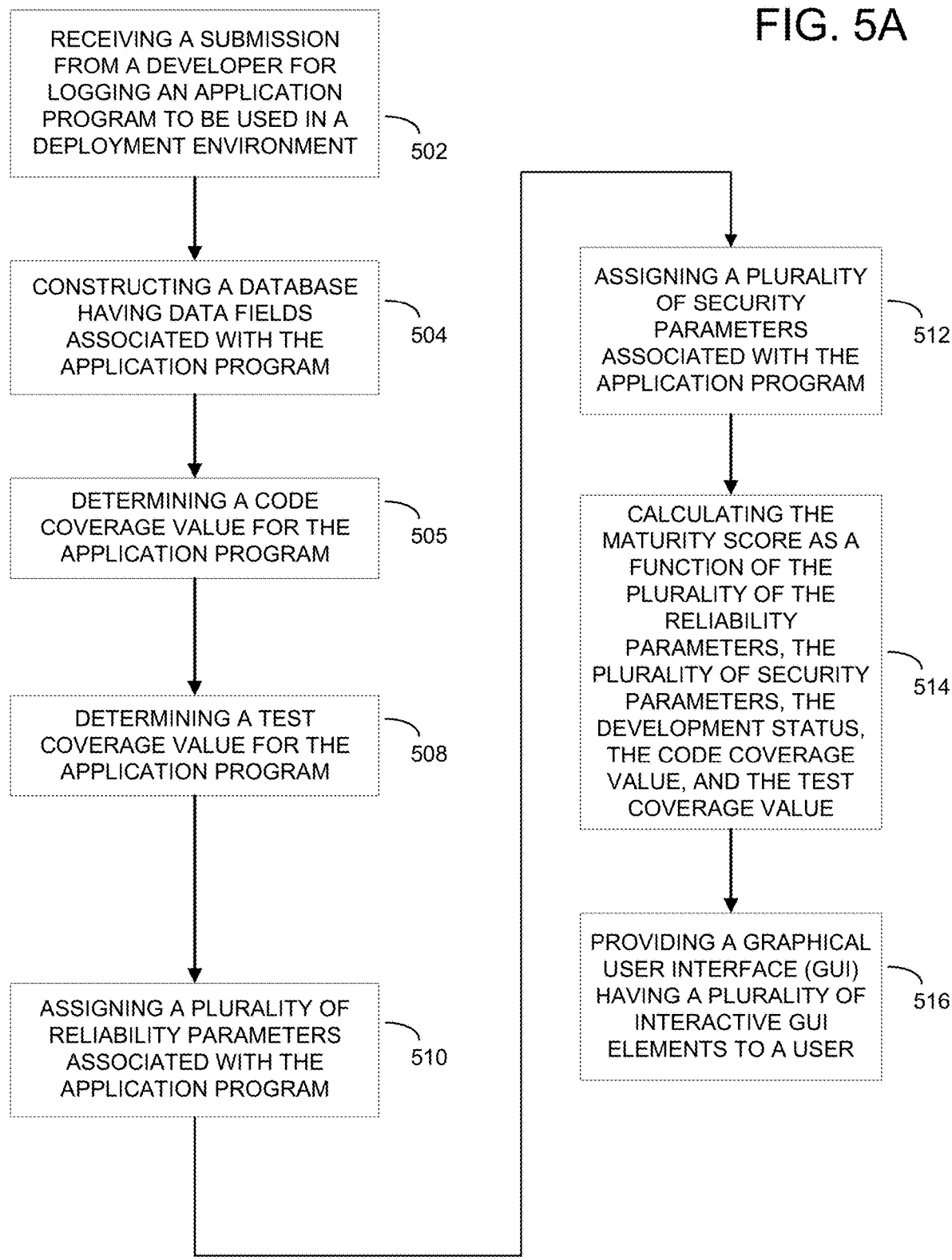
FIG. 5A is a flow chart illustrating a method according to one embodiment.

Referring now to FIG. 5, a flow chart illustrating a method according to one embodiment. At 502, the system (e.g., application maturity monitoring system) may receive a submission from a developer for logging an application program to be used in a deployment environment. See also a log of entries 520 that are fed into a software development life cycle engine 522 in FIG. 5B. In one embodiment, the submission may include a portion or a part of the application program. In addition, information from a code commit scan 524 and from author contribution statistics (e.g., GIT statistics) 526 may be collected to the engine 522. In one embodiment, the collections may be done automatically via one or more application programming interfaces (APIs). Once received at the engine 522, the different sources of data are stored in a database (DB) 528. At 504, the system may construct a database having data fields associated with the application program. In one embodiment, the database includes a data structure (e.g., data structure 200) for the code or the application program. In another embodiment, the data fields comprising at least one of the following: a development status associated with the application program, a technology identification associated with the application program, features associated with the application program, services in the deployment environment associated with the application program, and a maturity score for the application program. As illustrated in FIG. 2, the data structure 200 may have one or more fields for storing at least one of the data. In another example, the data collected from the log 520 may be loaded to the DB 528. The code commit data from the code commit source 524 may be used as parameters for the score rules. The author contribution source 526 may provide statistics for code review.

In another embodiment, the DB 528 may include the following tables for the data structure 200 and the data fields:

SCHEMA: basedb
Tables:
basedb.loyaltydevelops_stash
basedb.loyaltydevelops_scores
basedb.loyaltydevelops_toolsintegration
basedb.loyaltydevelops_sonarstats It is to be understood that other tables may be created and that other naming conventions may be used without departing from the spirit and scope of the embodiments.

At 506, the system may determine a code coverage value for the application program, and at 508, may determine a test coverage value for the application program 510. The system may further assign a plurality of security parameters associated with the application program at 512.

At 514, the system may calculate the maturity score as a function of the plurality of the reliability parameters, the plurality of security parameters, the development status, the code coverage value, and the test coverage value. At 516, the system may provide a graphical user interface (GUI) having a plurality of interactive GUI elements to a user. For example, in FIG. 5B, the application 530 may provide one or more GUI windows 532 and 534 for the developer to view various aspects of the embodiments as described.

Figure 6:
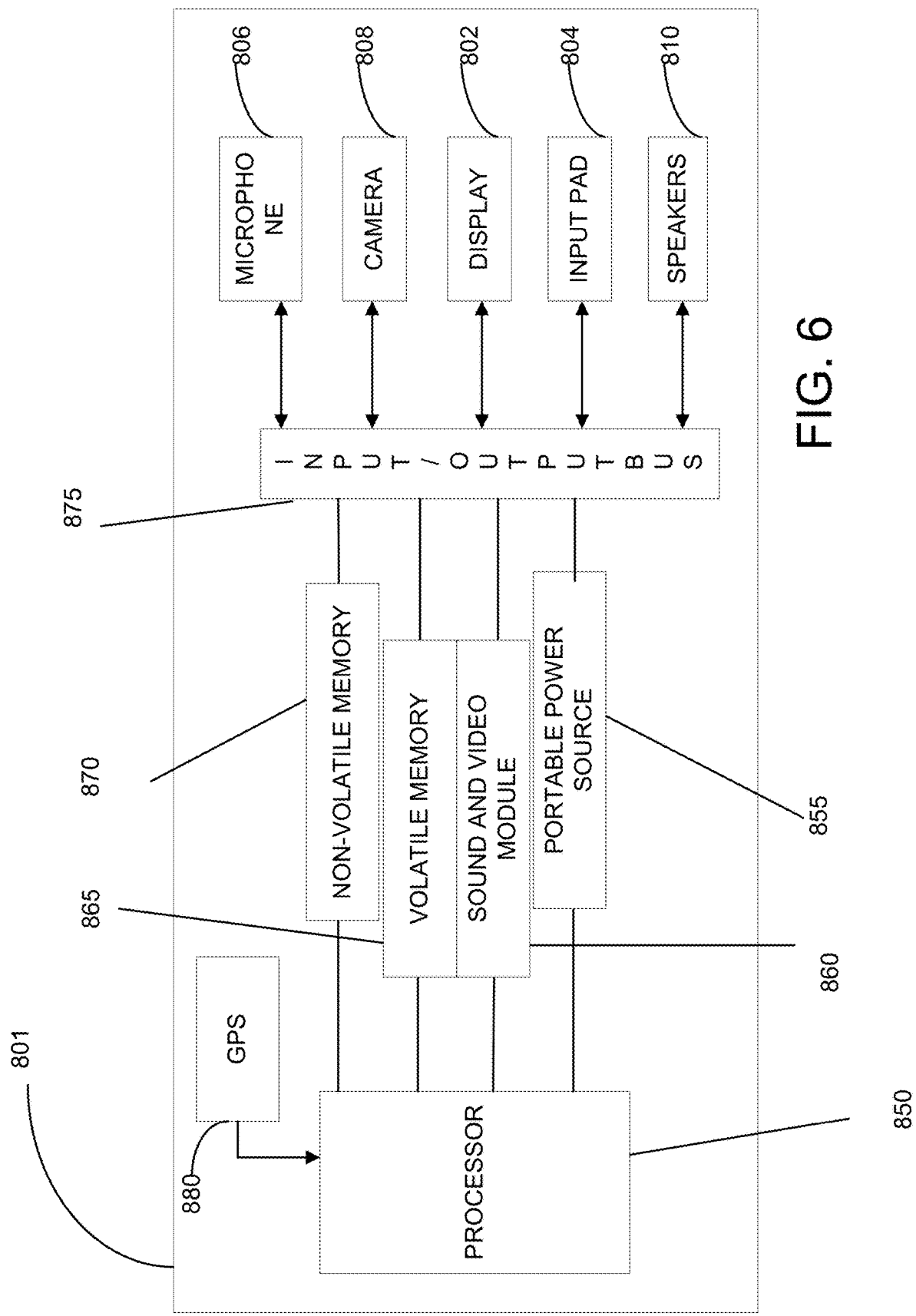
FIG. 6 is a diagram illustrating a portable computing device according to one embodiment.
Figure 7:
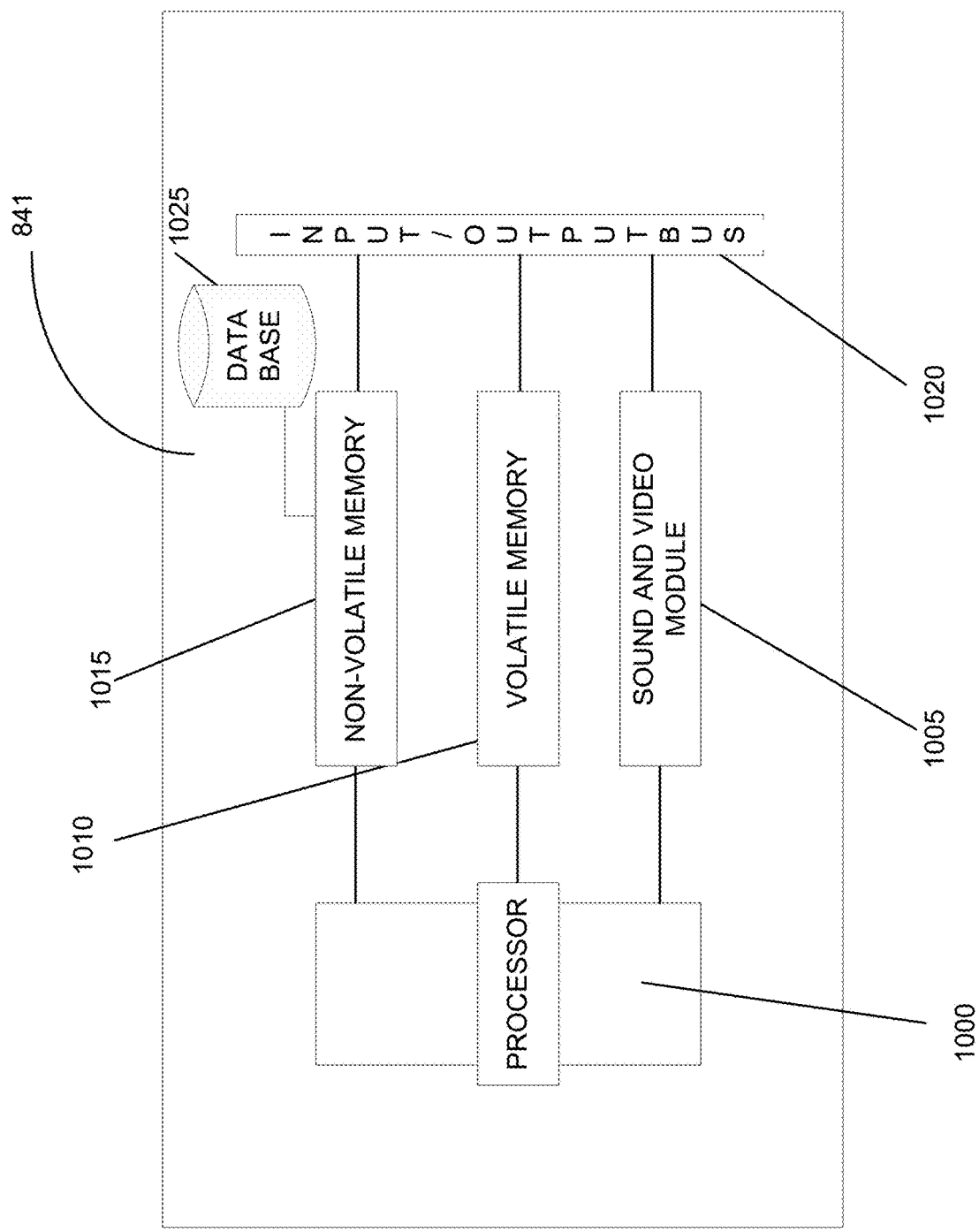
FIG. 7 is a diagram illustrating a computing device according to one embodiment.

FIG. 6 may be a high level illustration of a portable computing device 801 communicating with a remote computing device 841 in FIG. 7 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network 102 such as cellular service, through the Internet, through a private network, through BLUETOOTH, etc., FIG. 6 may be a simplified illustration of the physical elements that make up a portable computing device 801 and FIG. 7 may be a simplified illustration of the physical elements that make up a server type computing device 841.

FIG. 6 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 865 and volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc., It also may control of communicating with the networks, either through wireless or wired devices. Of course, this is just one embodiment of the portable computing device 801 and the number and types of portable computing devices 801 is limited only by the imagination.

The physical elements that make up the remote computing device 841 may be further illustrated in FIG. 7. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc., The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be computers that may have, among other elements, a microprocessor (such as from the Intel@ Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges with traditional approaches of manual entry of data in order to monitor and track application development. Aspects of embodiments create a data structure to represent code and applications so that during the lifecycle of the code, an administrator or manager may easily identify and score aspects of the application.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. An application lifecycle monitoring method comprising:
    receiving a submission from a developer for tracking a maturity of an application program as it goes through a Software Development Life Cycle pipeline and for deployment into a production environment;
    constructing a database having data fields associated with the application program, said data fields comprising one or more of the following: a development status associated with the application program, a technology identification associated with the application program, features associated with the application program, services in the production environment associated with the application program, and a maturity score for the application program;
    determining a code coverage value for the application program;
    determining a test coverage value for the application program;
    assigning a plurality of reliability parameters associated with the application program;
    assigning a plurality of security parameters associated with the application program;
    calculating the maturity score as a function of the plurality of the reliability parameters, the plurality of security parameters, the development status, the code coverage value, and the test coverage value; and
    providing a graphical user interface (GUI) having a plurality of interactive GUI elements to a user.

2. The application lifecycle monitoring method of claim 1, further comprising retrieving the development status from a third party code development platform.

3. The application lifecycle monitoring method of claim 1, further comprising determining a return of investment (ROI) value of the application program.

4. The application lifecycle monitoring method of claim 3, wherein the ROI value comprises a measure of time the application program takes from at least one of the following stages: number of product releases, build time, number of deployments, and deployment time.

5. The application lifecycle monitoring method of claim 1, wherein the code coverage value comprises a value as a function of data extracted from SonarGube.

6. The application lifecycle monitoring method of claim 1, further comprising monitoring changes to the application program before the application program is deployed in the production environment.

7. A system comprising:
    a database, stored in a memory of the system, for storing one or more portions of an application program, wherein the database comprises data fields associated with the at least one portion of the application program, said data fields comprising one or more of the following: a development status associated with the application program, a technology identification associated with the application program, features associated with the application program, services in the production environment associated with the application program, and a maturity score for the application program;
    a server comprises a processor for executing computer-executable instructions performing:
    receiving a submission from a developer for tracking a maturity of an application program as it goes through a software development life cycle pipeline and for deployment into a production environment;
    determining a code coverage value for the at least one portion of the application program;
    determining a test coverage value for the at least one portion of the application program;
    assigning a plurality of reliability parameters associated with the at least one portion of the application program;
    assigning a plurality of security parameters associated with the at least one portion of the application program;
    calculating the maturity score as a function of the plurality of the reliability parameters, the plurality of security parameters, the development status, the code coverage value, and the test coverage value; and
    providing a graphical user interface (GUI) having a plurality of interactive GUI elements to a user.

8. The system of claim 7, the server further performing:
retrieving the development status from a third party code development platform.

9. The system of claim 7, wherein the server further performing:
determining a return of investment (ROI) value of the at least one portion of the application program.

10. The system of claim 9, wherein the ROI value comprises a measure of time the at least one portion of the application program takes from at least one of the following stages: number of product releases, build time, number of deployments, and deployment time.

11. The system of claim 7, wherein the code coverage value comprises a value as a function of data extracted from SonarGube.

12. The system of claim 7, wherein the server further performing:
monitoring changes to the at least one portion of the application program before the at least one portion of the application program is deployed in the production environment.

13. The system of claim 12, wherein the server further performing:
calculating the maturity score as a response of the monitored changes.

14. A tangible non-transitory computer-readable medium having stored thereon computer-executable instructions for monitoring a lifecycle of an application program comprising:
receiving a submission from a developer for tracking a maturity of an application program as it goes through a software development life cycle pipeline and for deployment into a production environment;
constructing a database having data fields associated with the application program, said data fields comprising one or more of the following: a development status associated with the application program, a technology identification associated with the application program, features associated with the application program, services in the production environment associated with the application program, and a maturity score for the application program;
monitoring changes to the application program before the application program is deployed in the deployment environment;
determining a code coverage value for the application program; determining a test coverage value for the application program; assigning a plurality of reliability parameters associated with the application program;
assigning a plurality of security parameters associated with the application program;
calculating the maturity score as a function of the plurality of the reliability parameters, the plurality of security parameters, the development status, the code coverage value, the monitored changes, and the test coverage value; and
providing a graphical user interface (GUI) having a plurality of interactive GUI elements to a user.

15. The tangible non-transitory computer-readable medium of claim 14, further comprising retrieving the development status from a third party code development platform.

16. The tangible non-transitory computer-readable medium of claim 14, further comprising determining a return of investment (ROI) value of the application program.

17. The tangible non-transitory computer-readable medium of claim 16, wherein the ROI value comprises a measure of time the application program takes from at least one of the following stages: number of product releases, build time, number of deployments, and deployment time.

18. The tangible non-transitory computer-readable medium of claim 14, wherein the code coverage value comprises a value as a function of data extracted from SonarGube.

19. The tangible non-transitory computer-readable medium of claim 14, wherein the application program comprises a portion of the application program.

* * * * *